Jan. 23, 1962  R. PILOTY  3,018,472
ELECTRONIC PROGRAM-CONTROLLED DATA-PROCESSING INSTALLATION
Filed Dec. 23, 1955  2 Sheets-Sheet 1

Jan. 23, 1962   R. PILOTY   3,018,472
ELECTRONIC PROGRAM-CONTROLLED DATA-PROCESSING INSTALLATION
Filed Dec. 23, 1955   2 Sheets-Sheet 2

United States Patent Office 3,018,472
Patented Jan. 23, 1962

3,018,472
ELECTRONIC PROGRAM-CONTROLLED DATA-PROCESSING INSTALLATION
Robert Piloty, Munich, Germany, assignor to Stifterverband fur Die Deutsche Wissenschaft, Essen, Germany, a corporation
Filed Dec. 23, 1955, Ser. No. 555,158
Claims priority, application Germany Dec. 23, 1954
12 Claims. (Cl. 340—172.5)

The present invention relates to an electronic program-controlled data-processing installation that is particularly suitable for industrial or commercial computing operations.

It is characteristic of many data-processing tasks occurring in this field that very large amounts of disordered information must be processed in the shortest possible time. The crude information to be processed may consist of a very large number of separate information elements (IE), each of which represents the codified designation of a single business incident, such as a sale.

The crude information may be pre-stored on a magnetic tape. Since the order in which the IE come in and are pre-stored ordinarily has no relationship to the processing program, it is necessary that every single IE contain both value information, such as the unit price or the number of pieces to be used in reaching a specific processing result, (for example, a balance), and certain identifying information such as product, country, date, salesman, type of packing, etc., which last information determines the significance and origin of the business incident.

The ultimate objective of the installation is the combination, on the basis of the identifying features, of the numerous disordered IE that belong together in every single case, according to the given processing task. For this purpose, every IE must be examined as to its identifying features, and, based thereon, the machine must decide whether it is needed in a determined processing phase or not. This means that every IE must be identified on the basis of its features.

It is an object of the invention to greatly accelerate this identification process in comparison with processes known in the past, to considerably simplify the programming work, and at the same time, to keep the technical expenditures within moderate limits.

There are known electronic automata which ordinarily contain computing apparatus, high-speed storing means, control arrangements and feeding and delivery installations, which may at any time be programmed in such a manner that they accomplish the aforementioned work of identification. The known installations, however, are not capable of processing the numerous IE involved in the above defined task, in which the incoming huge masses of disordered IE have up to 80 places, in accordance with the pattern of known punch cards.

According to the invention, there is provided an identification device in the form of a scanning storage means, dimensioned to fit the task in question in which the IE to be identified, contained in the high-speed storage, are examined by scanning to determine whether or not the information contained in preselected places, of every IE, agrees with a desired identifying feature, or feature standard, retained in a special register. The location of those IE whose feature agrees with the desired feature is recorded within the scanning storage means by indication of an additional marking, e.g., a position number or address.

The scanning storage means first takes up a large number of disordered IE. Thereupon, its content is examined by scanning, IE by IE, to determine whether or not the information contained in determined, pre-selected places of each IE agrees with the feature standard retained in the special register. The IE are identified by the process of retaining, in another special register, the position in the scanning storage means (for example, in the form of a position number or address) of those IE whose feature agrees with the feature standard, thereby ensuring that they can be found again at any time. A magnetic drum is particularly suitable as a scanning storage means, because the nature of its operation is such that the stored information, in the order in which it is on the surface, is carried at high speed past the fixed position of the magnetic scanning heads, thus permitting the economic attainment of high storage capacities.

Moreover, it is possible, according to the invention, to release or activate other contact circuits associated with the drum by means of signals, in such a manner, that, after the arrival of such a release signal, a coincidence signal is recorded on the drum every time an IE whose feature agrees with the desired feature is scanned, and retain its address number in a special register for further use, in such a manner that the first activating signal leads to the identification of the first (that is, first from a determined zero-position of the drum) information element having the desired feature, the second to the identification of the second IE having the desired feature, and so on, until such time when all such IE have been scanned on the drum, which is indicated by a special signal.

In many cases, one must take into consideration that the occurring features may each comprise a great number of places, about 20 or more decimal digits. It would, in many such cases, be uneconomical to build an installation for the comparison of features of so many places.

In order to take proper care of cases involving very long features, each drum cell includes one or a plurality of places in addition to those required for an IE, and additional heads and the related amplifiers are provided therefor. Feature comparison is carried out as described above, but now in an arrangement which indicates feature coincidence by inserting a coincidence mark, by magnetization, in one of the above mentioned additional places in each cell containing an IE having a desired feature. And in the manner described above in connection with feature coincidence, the coincidence marks in the several cells are compared, one by one, with pre-established combinations of marks, or combination standards, to identify those IE which fit the combination standard.

An important characteristic of the invention is the fact that the information is processed in the identification portion and in the related devices for feeding and delivery, in essentially larger units than in the other portions such as the high-speed storage means, the control arrangements and the computing apparatus.

A fundamental drawback of known automata is the fact that a word within the machine contains only about 10, at most perhaps 15, decimal digits. This limitation is explained by the fact that for the solution of the mathematical problems for which those automata are primarily intended, 10 to 15 digits are sufficient in practically all cases, and also by the danger involved in increasing the number of digits—that the expenditures grow beyond reasonable proportion or the working speed drop too low. If such automata are employed for computing operations, the information contained in a business incident greatly exceeds, in almost all cases, the capacity of such a word. One is then compelled to distribute the IE related to a business incident among several mutually independent machine words, and has to resort to the program in order to establish the relationship between the various components during the entire processing operation. This makes the program cumbersome and lengthly. A special disadvantage resulting therefrom lies in the fact that insignificant modifications of the processing task, leaving the principle untouched, such as a balancing task that relates only to other feature places, frequently render a complete changeover of the program imperative.

According to the invention, the length of the words in the identificaion portion, including the feeding and delivery arrangement, is more than double the greatest length of a word in the other portions of the machine. It is practically advisable to identify the information in units corresponding to the capacity of punch cards, viz. about 80 letter places or figure digits, after which they are broken down into components of about 12 places or digits. Thus, for the keying of most business incidents, one word (of 80 places, for example) suffices, so that in the important identification phase a business incident is treated by the machine as a natural unit, from which considerable simplifications in the identification program are derived.

In the evaluation phase, after the identification of a business incident, the latter is split into units of at most 12 places, the number being determined by the evaluation requirement, such as unit price, number of pieces, or rate of discount. These units are then, in most cases, arithmetically processed in the other portions.

According to the invention, in order to effect the transition from the portion of about 80 places to the portion of about 12 places, or vice-versa, arrangements are provided for effecting the complete or partial distribution of information contained in a word of great length after it leaves the identification installation, among the corresponding number of words of small lengths, the manner of distribution being adjustable within more or less wide boundaries, said arrangements permitting, in inverse direction, the combination of an information appearing distributed among several words of small lengths, into one word of great length, the distribution also being adjustable in the latter case.

Since the distribution between the places of a large word and those of the small words can be and is, in all practical cases, made equal in the processing operation for a large number of IE, the invention provides for establishing the distribution, before processing, by manual regulation, e.g., on a cord-plug connection board or on a cross rail distributor.

This selector arrangement is coupled, according to the invention, with a distributor register, that takes up, in one traffic direction, the regulated parts of the information contained in the large word; and in the other traffic direction, makes available the information to be combined into a large word, said distributor register operating in such a manner that its places can be called from the control mechanism of the automaton in fixed, mutually independent groups, whose magnitudes correspond to words of small length, either in order to deliver information in units of said magnitude from the distributor register for further processing into the machine portions of small word length, or in order to inscribe into the distributor register information of small word length, brought about in these units.

The figures represent an example of an embodiment of the invention, with demonstration of further characteristics and details.

Figure 1:
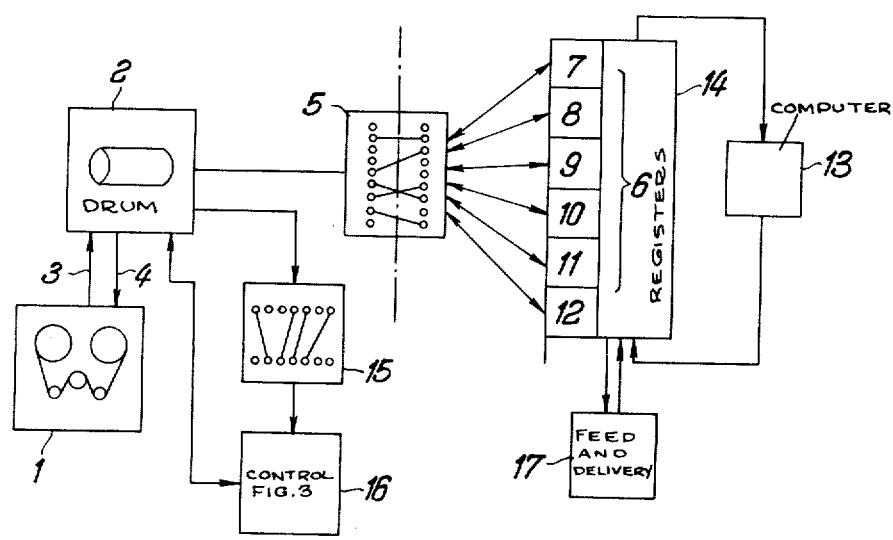
FIGURE 1 shows a schematic design of the installation.

The installation of FIGURE 1 contains one or a plurality of magnetic tape arrangements 1, that take up the disordered IE on magnetic tapes. The tape may be fed by hand with the aid of a keyboard, or it may be provided with the IE through the employment of punch cards. The installation contains, moreover, the identification arrangement 2, using a magnetic drum for its operation. The arrangement 2 is fed by the magnetic tape 1 with disordered information to be identified in units of 80 places, as indicated by the arrow 3. Moreover, in inverse direction 4, information existing on the drum may be delivered to the magnetic tape in the same units.

The 80 place information elements having features which fit a predetermined feature standard can be fed by the identification arrangement 2 into a main selector 5. This selector assigns determined (pre-selected) places of the arriving IE to the places of a distributor register 6. This distributor register 6 comprises about 100 places, so that the information of an 80 place element can be easily accommodated. The distributor register 6, that can at once be supplied with information from an 80 place element, is divided into single cells 7, 8, 9, 10, 11 and 12, each having about 12 places. The information existing in the distributor register can be called by the central computing machine 13, with reference to determined places, in units of such cells, in order to be further processed. This renders it possible to dissolve an 80 place large machine word into units corresponding to the small word length in the computing machine proper 13.

In the inverse direction, it is possible to supply from the central part 14 the single cells of the distributor register 6 with information newly created by arithmetical combination which can be at once conveyed onto the selector-determined places of an 80 place large machine word in the identification arrangement 2. Thus, the installation is capable of producing 80 place results, that can then be delivered to the magnetic tape 1, from which they can be transferred in a known manner on to punchcards, or printed by means of a tabulator.

The installation also comprises, in connection with the identification arrangement 2, a feature selector 15, that acts upon the identification arrangement through a control device 16 in a manner described below.

Moreover, the installation may be provided with feed and delivery apparatus 17, that permits the immediate feeding of 12 place IE into the central part 14, or their immediate pick-up from said part 14.

Figure 2:
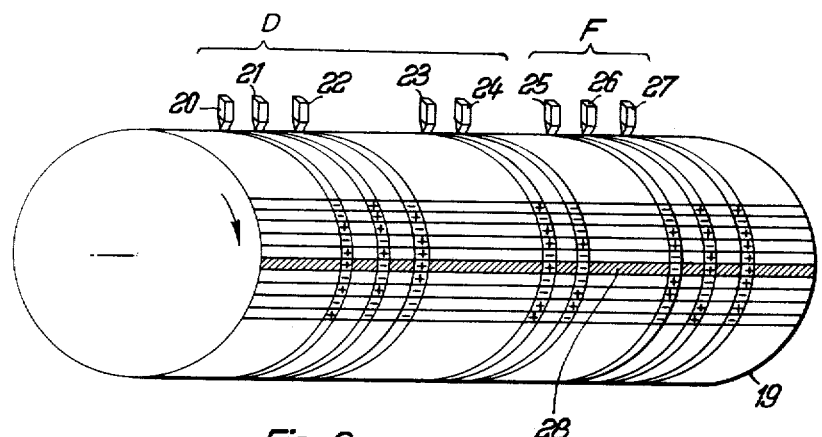
FIGURE 2 shows a schematic view of the scanning storage means.

FIGURE 2 represents an example of an embodiment of the scanning storage means and the grouping of the IE on the drum surface of this storage means. The drum 19 is provided on its surface with a magnetizable material and rotates at high speed, for example 6,000 revolutions per minute. There are, close to the surface of the drum, a number of magnetic heads; only a few of them, namely the heads 20–27, are shown in the figure.

The magnetic heads have, group by group, different tasks. Each magnetic head 20, 21, 22, 23, 24 of the group D on the drum surface writes a trace, carrying elementary 0–1 signals (for example, positive and negative magnetization). To represent a business incident, that is, an IE, the traces belonging to the group of heads D are employed in such a manner that the information contained in the business incident is expressed, letter by letter and figure by figure, by a binary code group, and the thus created sequence of binary figures is assigned, place by place, each to a trace belonging to the group D (parallel representation). There are thus established a number of cells 28, each having the capacity for one IE, the number of cells 28 being the same as the number of 0–1 signals for which there is room on one trace.

The drum is equipped with basic, known electronic instruments that permit the selection of a desired cell 28 for writing or reading in such a manner that at the moment when this cell runs past the heads of the group D, either the information places, made available in a special register, are simultaneously written down by the heads, or in inverse direction, the information existing in the cell is read with the aid of the voltage induced in the heads.

Thus, it is possible to have the drum inscribed with a large number of disordered IE from the magnetic tape in a short time, and in inverse direction, the drum can deliver ordered results to a magnetic tape.

The task of the additional heads 25, 26, 27 of the F group will be clear from the following description of the identification arrangement and the contact circuits connected therewith and employed for the generation of coincidence signals.

Figure 3:
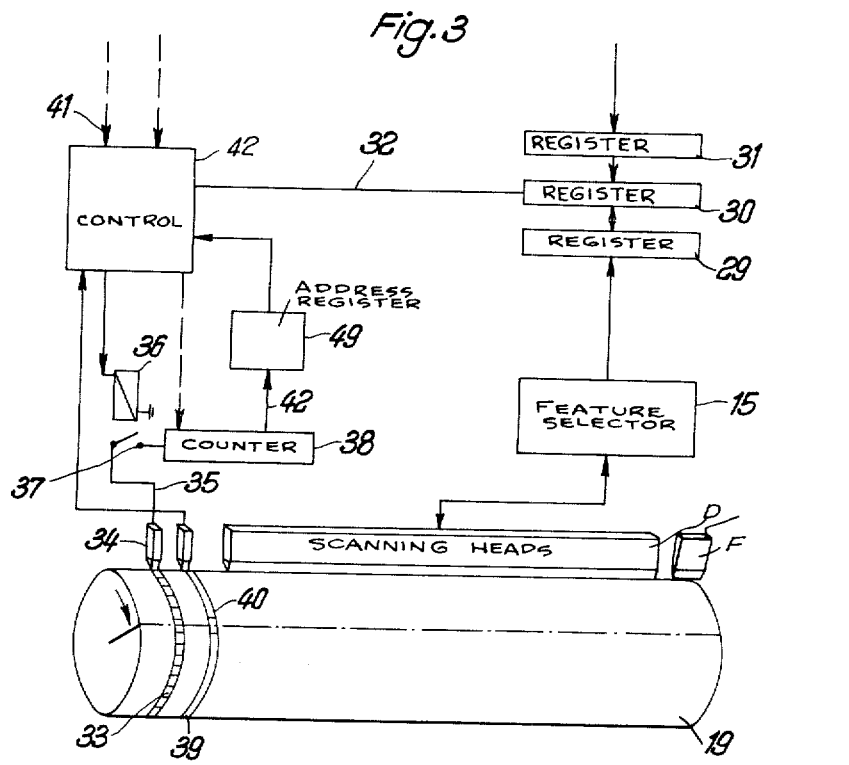
FIGURE 3 shows the wiring diagram of the identification arrangement.

In addition the drum 19 has provision for two additional traces 33 and 39 together with magnetic heads therefore as shown by FIG. 3. Trace 33 is the address trace and includes a magnetized spot for each cell 28, and trace 39 is a timing trace containing only one magnetized spot 40 indicating the zero position or starting position of the drum 19.

Thus the drum 19 is divided into a series of horizontally arranged cells 28, each having spaces for receiving an 80 place word or information element, and, in addition having extra places for receiving an address, a zero or timing place, and at least three places for receiving coincidence markings from the heads of group F.

Considering the operation of FIG. 3, as the drum 19 is rotated, one address impulse for each cell passing the heads is picked up by address head 34 and transmitted to a counter 38 over line 35 and through contact 37 of relay 36. Thus the counter 38 receives one impulse as the first cell passes, a second impulse for the second cell and so forth whereby the sum of the impulses received by counter 38 represents the number of cells that have passed by the magnetic heads or, in other words, the address of the last cell.

To energize relay 36 to commence operations, a start impulse is directed over line 41 to control unit 42 and thereafter a timing pulse is transmitted from spot 40 of timing trace 39 thereby signaling that the drum is in its zero or starting position. Upon these two impulses being received by control unit 42, the relay 36 is energized to close contact 37 and commence the operation of address counter 38.

Thereafter as each cell 28 passes beneath magnetic heads D, its multiplace features are scanned by the magnetic heads and pulses are transmitted through the feature selector 15 for comparison with the feature standard previously established in special registers 29, 30, and 31. When a cell is reached having features that coincide with the standard, an impulse is transmitted over line 32 and enters control unit 42 which thereupon de-energizes relay 36 to open its contact and stop counter 38. Since the counter has been summing one impulse from each cell 28 as it passes the magnetic heads, its total count at the time it is stopped equals the address of the first cell having the desired features.

In addition to stopping the counter 38, the control circuit also transfers the number (address) within counter 38 to the address register 49 to be retained therein for later processing.

After the first information element having the desired features has been found, as described above, the control unit 41 receives another start impulse over line 42, and after also receiving a timing impulse from spot 40 and a third impulse indicating that the drum 19 has passed the cell 28 containing the previously identified feature, it again energizes relay 36 to close contact 37. This connects counter 38 to address head 34, and the scanning of the drum is continued until another cell 28 is found having features which coincide with the standard in registers 29, 30 and 31. When this occurs, the counter 38 is again disconnected and the address of the second matching IE is transferred into address register 49 to be retained.

The scanning of each cell is continued in the manner described above until all cells have been scanned and the addresses of those having features coinciding with the standard have been recorded in the address register 49. When this has occurred, the next start impulse received by control unit 42 is immediately followed by an impulse from zero trace 39, indicating that all cells have been compared and the drum has passed its zero position. When these two impulses occur, the control unit completes its functions and transmits a signal to the computer outside so that further start pulses over line 41 are ineffective.

As generally mentioned above, it would be uneconomical to carry out the simultaneous comparison of features having a large number of places, since this would require an unduly large number of multiplace registers 29, 30, and 31. Furthermore, in many instances it may not be necessary to identify the complete features of each IE but only certain partial features such as, for example, salesman, product, and country. For example, if it is desired to identify only the IE concerning the sales of radios made by salesman $x$ in country $y$ for purposes of later computing the salesman's commission, the machine need only identify those partial features and may ignore other partial features such as kind of packing, quantity discount, and others.

Figures 4, 5:
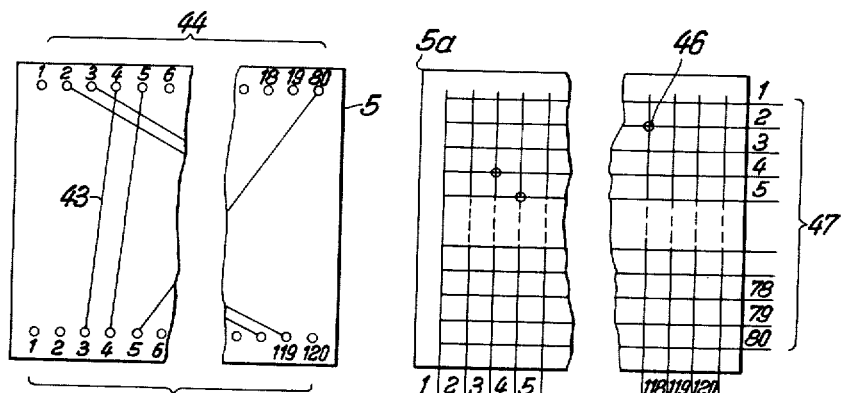
FIGURE 4 shows an embodiment of a selector with plug cords.
FIGURE 5 shows another embodiment of a selector with cross rails.

According to the present invention, this partial feature comparison may be performed by employing the feature selector 15 as shown in FIG. 3. This feature selector, consisting of a board having plug cords or a cross rail device having connecting plugs, as shown in FIGS. 4 and 5, respectively, is employed to connect only certain of the magnetic heads D with the inputs of registers 29, 30, and 31. Therefore, it will effect coincidence comparison of only a predetermined group of partial features and will ignore the remaining groups of partial features that are not pertinent to a particular identification problem. Thus by the use of a feature selector 15, all IE having a given combination of partial features may be identified.

In many instances, however, it is also desired to identify the complete features having a larger number of places than are available in the registers 29, 30, and 31. According to the present invention this may be performed by dividing the complete features into three or four partial feature groups and sequentially identifying each partial feature group and placing a new code on the drum. Thereafter the new code may be scanned to eliminate all IE excepting those that contain the complete feature information.

For example, let it be assumed that the complete feature identifies nine quantities—salesman, product, country, rate of discount, type of packaging, color of product, shipping weight, import duty, and distributor. At first, all the IE may be scanned using a first feature selector 15 to determine those which contain the partial feature group-salesman A—country B—product C. In each cell containing this partial feature, an additional marking is placed by magnetic head 25 as shown in FIG. 2. In a second scanning operation a second ararngement of the feature selector board 15 is used to identify those IE which contain the second partial feature group—rate of discount D—type of packaging E—and color of product F. In each cell containing this second group of partial features, a second additional marking is placed by magnetic head 26. In a similar manner, the third operation identifies the remaining partial feature groups, and a third additional marking is placed in each appropriate cell by magnetic head 27. Thus, after these three scanning operations have been completed, a new code of three places appears in each cell, and this new three place code may then be scanned to identify those IE whose complete feature coincides with the over-all feature standard.

The traces of the group F, brought about by the heads 25, 26 and 27, are three additional traces of this nature.

The figure shows that the randomly selected shaded cell 28 is characterized by the markings "— + +", which signifies that the identification has been based on a tripartite feature, and for the selected IE standing in cell 28, the first looked-for partial feature does not match the corresponding feature standard whereas the second and third partial features do match their standards. This information is then employed to retain, with the aid of a circuit similar to that shown in FIGURE 3, the addresses of those IE which match a predetermined combination of features. The selected feature places can be assigned, before the beginning of the identification task, at will to the places of about three to four feature groups of 12 places, with the aid of the feature selector 15. The operation may be such that one assigns groups to the feature places at the outset for predetermined partial features, such as country, product, kind of packing, etc.

As described above, it is assumed that either differently arranged feature selectors are employed for each operation, or, alternatively, that the feature selector plug in cords or plugs are varied for each operation. However, as is believed evident to those skilled in the art, an enlarged feature selector connected to all magnetic heads may be employed for all four scanning operations if the board is provided with suitable electrically operated switching means.

The main selector 5, shown in FIGURE 4, which brings about the connection of the 80 place identification arrangement with the 12 place distributor register and the computing mechanism respectively, operates with plug cords 43, serving to connect selected inputs 44 with selected outputs 45. Instead of this arrangement, one may employ a cross rail selector 5a according to FIGURE 5, in which the selection is made with the aid of connecting plugs 46, that are inserted at the cross points of the rails 47 and 48.

The feature selector 15 is designed in a similar manner.

Thus, the apparatus of the invention comprises scanning multiplace storage means 19 in which is established a storage cell 28 for each information element to be processed, each cell having, in addition, an address or position number by which the information element therein can be located when needed, and further additional places for the insertion of a new code for partial feature identification. The apparatus further includes means 20 to 24 for simultaneously scanning all or partial features of the elements in the cells of the storage means one by one, and means 31 for comparing each of the multi-place identifying features of each information element with a corresponding predetermined feature standard.

When such a comparison indicates coincidence between a partial feature of the element being identified and the feature standard, a coincidence signal is produced and inserted by means of a magnetic head such as 25 into an additional place in the cell occupied by the IE being scanned.

The combination of coincidence signals in the several cells 28 of the storage means 19 is then scanned and compared to a predetermined combination standard by means similar to the feature comparison means 31. When such comparison indicates a match between the combination of coincidence signals in a particular cell and the predetermined combination standard, the address of such cell is retained in register 49.

Thereafter, when the programming control calls for an information element whose address is contained in register 49, such element is broken down by distributor means 6 into sub-elements for further processing by computer proper 13.

Desirably, according to the invention, computer proper 13 delivers its results in the form of units having about the same length as said sub-elements, which units are combined by the distributor means into result elements having about the same length as the original information elements; and the result elements can then be recorded in the identifying storage means 19 and/or delivered to the output of the machine for further use.

In addition, raw information may be fed directly into the computer proper in the units having the same length as said sub-elements, without going through the identification means; and in inverse direction, the products of the computer proper may be fed in the form of such elements to points outside the installation.

I claim:
1. Apparatus for processing crude information in the form of a number of multi-place information elements, each of which includes a plurality of multi-place identifying features, said apparatus comprising storage means having a multiplace cell for each such element to be processed, each such cell having an address and additional places for receiving information; means for scanning the cells of the storage means, one by one; means for simultaneously comparing each of said plurality of multi-place features with a corresponding one of a plurality of predetermined feature standards; means for producing a coincidence signal whenever a multiplace feature of the element being scanned coincides with its corresponding feature standard; means for inserting each such coincidence signal in an additional place of said cell occupied by the element being scanned, each cell having a plurality of additional places, one for each feature compared to a feature standard; means for scanning said coincidence signals, cell by cell; means for comparing the combination of coincidence signals in the cell being scanned with a predetermined combination standard; means for indicating the address of each cell whose combination of coincidence signals conforms with said combination standard; register means for retaining the addresses of such conforming cells; distributor means for breaking down the multi-place information elements whose addresses are in said register means into sub-elements having fewer places; computers means and means for transferring said sub-elements to said computer means.

2. Apparatus in accordance with claim 1, in which the output of said computer means is in the form of units having the same number of places as said sub-elements and in which said distributor means is constructed and arranged to assemble such units into result elements having the same number of places as said information elements; and further including means for inserting result elements assembled by said distributor means into cells of said storage means.

3. Apparatus in accordance with claim 2, and further including means for delivering output units produced by said computer means for use outside the apparatus.

4. Apparatus in accordance with claim 1, and further including means for feeding information elements having the same number of places as said sub-elements into said computer means from outside the apparatus.

5. Apparatus in accordance with claim 1 in which the number of places in said sub-elements is less than one-half of the member of places in said information elements.

6. Apparatus in accordance with claim 1 in which said distributor means is adjustable to effect distribution of the places of an information element among said sub-elements.

7. Electronic program controlled apparatus for processing information in the form of a number of multi-place information elements, each of which includes an identifying feature, said apparatus comprising storage means for storing each element at an identifiable address therein; means for scanning the multiplace elements in the storage means in a parallel arrangement, one by one; means for comparing said feature with a feature standard; means for indicating the address of each element whose feature conforms with said standard; and register means for retaining the addresses of a plurality of conforming elements.

8. Apparatus in accordance with claim 7 in which said storage means comprises a rotating drum having a magnetizable surface and a plurality of magnetic scanning heads whose number is at least equal to the number of places in said information elements.

9. Apparatus in accordance with claim 8 in which said heads are arranged to influence the said magnetizable surface in a line contained in an axial plane of the drum whereby to establish information cells extending axially of the drum surface whose addresses are related to the circumferential position of such cells on the drum.

10. Apparatus in accordance with claim 7, and further including means for generating a series of periodic release signals, and means responsive to successive members of said series to initiate successive scannings of said storage means and consequent retention of the addresses of successive conforming elements in said register in the order in which said conforming elements are stored in said storage means.

11. Electronic program controlled apparatus for processing crude information in the form of a number of multi-place information elements, each of which includes a plurality of multi-place identifying features, said apparatus comprising storage means having a cell for each such element, each such cell having an address; means for simultaneously scanning the elements in the cells of the storage means, one by one; means for comparing each of said plurality of features with a corresponding one of a plurality of predetermined feature standards; means for indicating the address of each cell occupied by an element all of whose features conform with their respective feature standards; and register means for retaining the addresses of a plurality of such conforming cells.

12. Electronic program controlled apparatus for processing crude information in the form of a number of multi-place information elements, each of which includes a plurality of multi-place identifying features, said apparatus comprising storage means having a cell for each such element, each such cell having an address; means for scanning groups of the features in the cells of the storage means in a parallel arrangement, one by one; means for comparing each said groups with a corresponding group of predetermined feature standards; means for producing a coincidence signal whenever a feature group of the element being scanned coincides with its corresponding feature standard; means for inserting each coincidence signal in the cell occupied by the element being scanned, each cell being capable of accommodating one coincidence signal for each feature compared to a feature standard; means for scanning said coincidence signals, cell by cell; means for comparing the combination of coincidence signals in the cell being scanned with a predetermined combination standard; means for indicating the address of each cell whose combination of coincidence signals conforms with said combination standard; and register means for retaining the addresses of such conforming cells.

References Cited in the file of this patent
UNITED STATES PATENTS

| | | |
|---|---|---|
| 2,549,071 | Dusek et al. | Apr. 17, 1951 |
| 2,609,439 | Marshall et al. | Sept. 2, 1952 |
| 2,674,733 | Robbins | Apr. 6, 1954 |
| 2,679,638 | Bensky | May 25, 1954 |
| 2,721,990 | McNaney | Oct. 25, 1955 |
| 2,797,862 | Andrews | July 2, 1957 |
| 2,885,659 | Spielberg | May 5, 1959 |